July 15, 1969    R. H. TWEEDY ET AL    3,455,598
TRACTOR ROLL BAR AND CANOPY

Filed July 17, 1967      2 Sheets-Sheet 1

*INVENTORS*
R. H. TWEEDY
J. H. EDMAN

INVENTORS
R. H. TWEEDY
J. H. EDMAN

United States Patent Office 3,455,598
Patented July 15, 1969

3,455,598
TRACTOR ROLL BAR AND CANOPY
Robert Hugh Tweedy, Pittsburgh, Pa., and John Harold Edman, Cedar Falls, Iowa, assignors to Deere & Company, Moline, Ill., a corporation of Delaware
Filed July 17, 1967, Ser. No. 653,850
Int. Cl. B62d 25/06
U.S. Cl. 296—102                                  4 Claims

ABSTRACT OF THE DISCLOSURE

A tractor having a rearward axle housing, a seat above the axle housing, an inverted U-shaped roll bar structure having its lower ends atached to the axle housing and encompassing the tractor seat, and a cantilevered canopy attached to the roll bar structure and overlying the tractor seat.

Background of the invention

The invention relates tractor roll bar structure having a canopy thereto to protect the operator from the elements.

Every year a large number of fatalities and injuries occur as the result of tractors tipping over during their operation. Many types of roll bar structures have been devised for attachment to tractors to provide some degree of roll-over protection for the operator. However, many of these structures have been relatively elaborate, or have interfered with the mounting of allied equipment on the tractor, or have impeded the visibility and freedom of the operator, and accordingly have not been widely accepted.

The comfort of the tractor operator has also been an increasingly important consideration in tractor design, and many types of canopies have been designed to protect the operator from the elements. However, previous canopies have been incompatible with roll bar structures on the tractor, resulting in a sacrifice of either the comfort or the safety of the operator. In fact, most previously known canopies have increased the hazards to the operator, since they interfered with the operator jumping clear of the tractor during a tractor upset.

Summary of the invention

According to the present invention, there is provided a simple, rugged roll bar structure, which is easily attachable to and removable from a tractor, and which does not interfere with the mounting of most equipment on the tractor or the visibility and convenience of the operator. There is also provided a cantilevered canopy structure, which can be optionally and rigidly secured to the roll bar structure in an overlaying relationship with the operator's station to partially protect the operaor from the elements, while avoiding interference with the visibility of the operator or with tractor-mounted equipment. Since the canopy structure requires the use of the roll bar structure, it also results in a wider use of the roll bar protection, since it has been found that tractor users will adopt a convenience or comfort feature much more readily than a safety feature.

Another feature of the invention resides in the provision of such a roll bar and canopy, which can easily be adapted for attachment to many different types of tractors, and which can be provided as optional equipment for new tractors or mounted on tractors already in use.

Description of the preferred embodiment

Figure 1:
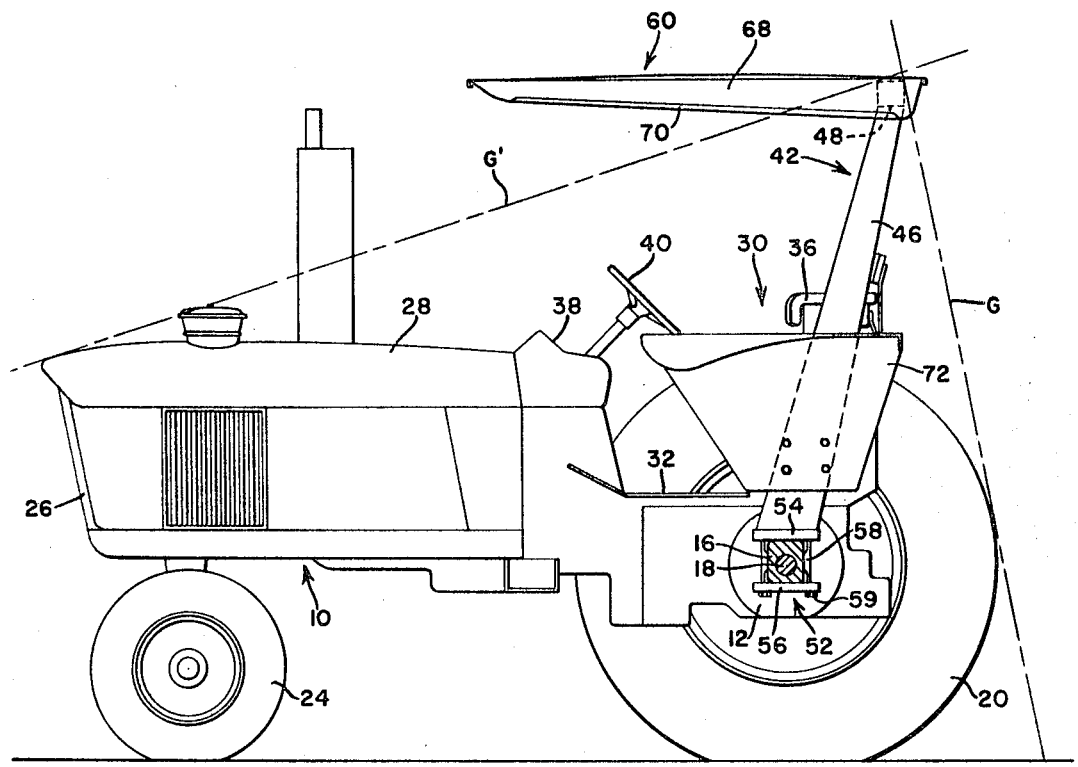
FIG. 1 is a left-side elevation view of the tractor with the roll bar and canopy mounted thereon and with the left rear wheel removed.
Figure 2:
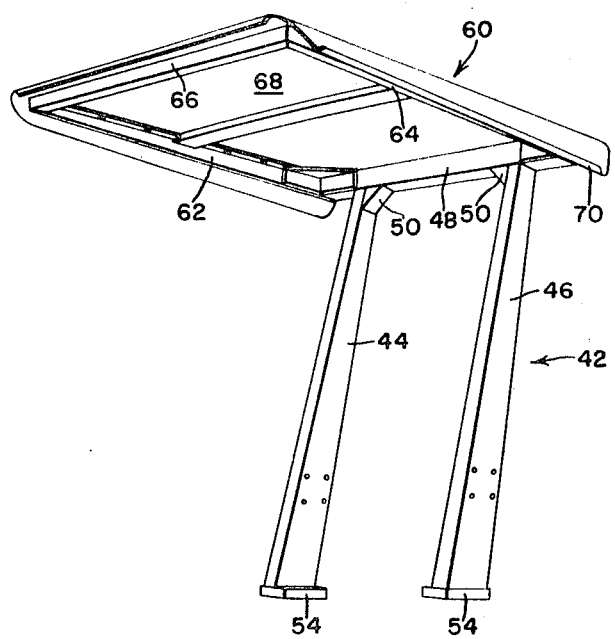
FIG. 2 is a left front perspective of the roll bar and canopy separated from the tractor.

The invention is illustrated on a typical agricultural tractor having a fore-and-aft body or main frame 10, including a rearward transmission housing 12, from the opposite sides of which extend right and left, transversely extending, axle housings 14 and 16 respectively. The terms "right" and "left" are with reference to a person facing the forward end of the tractor, and such terms, as well as terms such as "forward," "rearward," "upper," "lower," etc., are terms of convenience, used to more clearly describe the invention, and are not to be construed as limitations. Each axle housing supports an axle 18 on which right- and left-hand traction wheels 20 and 22 respectively are mounted. As best seen in FIG. 1, the axle housings 14 and 16 have a generally rectangular cross section, it being conventional to provide at least a portion of the axle housing with such a rectangular cross section. The axle housings are also provided with upright, transversely spaced grooves 23 along the forward and rearward sides.

The forward end of the tractor frame is supported by steerable front wheels 24 and includes a reinforced upright front member 26, sufficiently strong to support the front end of the tractor should the tractor upset. The tractor is also provided with a hood structure 28 of conventional construction. An operator's station, indicated in its entirety by the numeral 30, is disposed above the rearward transmission housing 12, the operator's station 30 including a floor 32, a seat support structure 34 mounted on the housing 12 rearwardly of the floor 32, a tractor seat 36 mounted on the seat support, an instrument panel 38 rearwardly of the hood 28 and facing the tractor seat, and a steering wheel 40, projecting rearwardly from the cowling and instrument panel toward the tractor seat.

An inverted generally U-shaped roll bar structure, indicated in its entirety by the numeral 42, is attachable to the axle housings 14 and 16 and includes generally parallel right and left upright leg members 44 and 46 respectively, connected at their upper ends by a transverse horizontal bight member 48, the opposite ends of the horizontal bight member 48 extending laterally beyond the upright legs and terminating above the right and left traction wheels 20 and 22. The roll bar members 44, 46, and 48 are of relatively strong, box-type beam construction, the connections between the upright members 44 and 46 and the horizontal member 48 being reinforced by corner blocks 50.

The lower ends of the upright leg members 44 and 46 are respectively attached to the right and left axle housings 14 and 16 by clamping devices 52, each clamping device including a flat horizontal plate 54 secured to the bottom of the upright leg member and engageable with the top of the axle housing, a bottom plate 56 engageable with the bottom surface of the axle housing, and four clamping bolts 58 having their upper ends threaded into the upper plate and their lower ends extending through the bottom plate and provided with nuts 59 threadable on bolts to move the plates 56 and 54 toward one another, thereby clamping the upper plate and the leg member attached thereto to the axle housing. Since the top and the bottom of the axle housings are flat, they resist turning of the upright leg members about the axle in a fore-and-aft direction, and the bolts 58 are received in the upright grooves 23 to prevent lateral shifting of the leg members.

Figure 3:
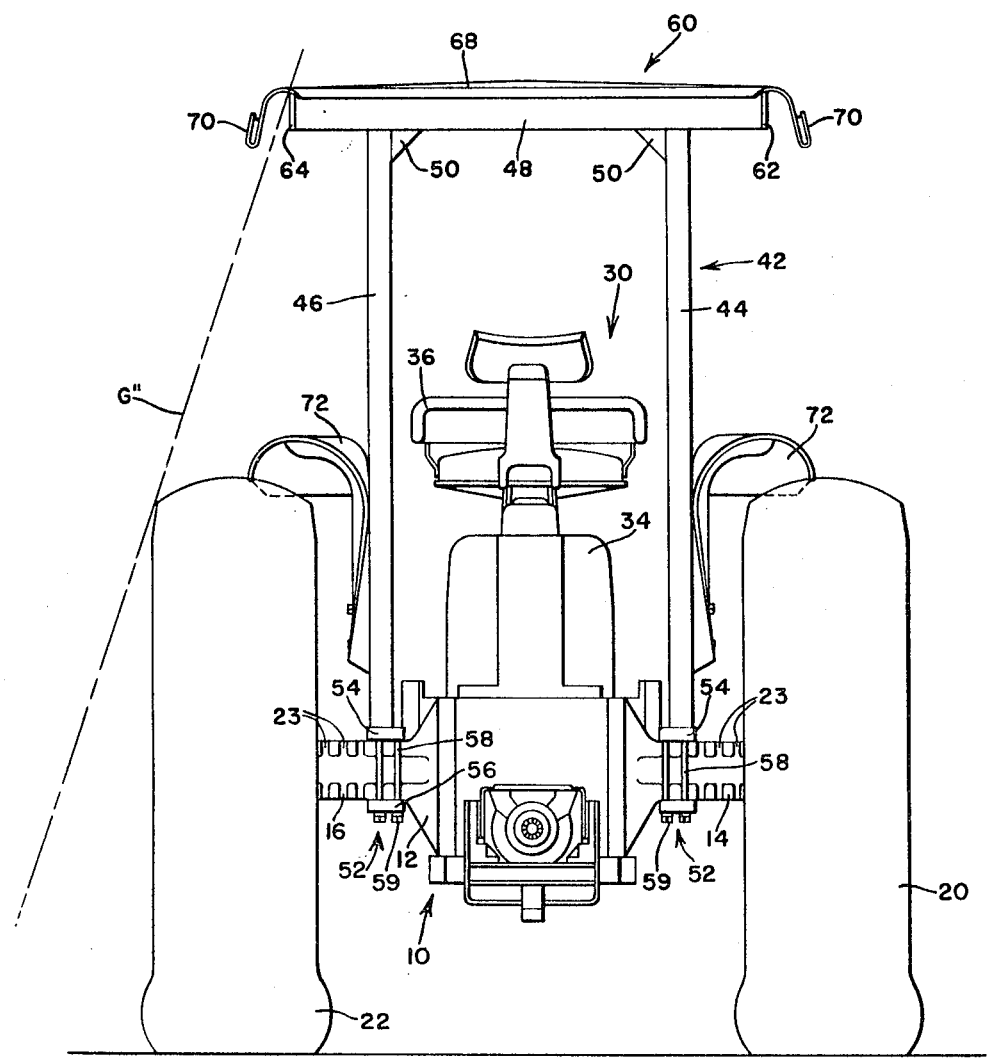
FIG. 3 is an enlarged rear elevation of the tractor with the roll bar and canopy mounted thereon.

The clamping device 52 and the roll bar members are sufficiently strong to not only support the tractor in an inverted position, but also withstand considerable impact without substantial deformation, such as would be imparted to the roll bar structure during a lateral or fore-and-aft tipping of the tractor. As best seen in FIG. 1, the tractor seat 36 is in substantial vertical alignment with the axle housings, and the upright leg members 44 and 46 are slightly inclined upwardly and rearwardly, so that the horizontal member 48 is above and slightly rearwardly of the head of the operator while he is sitting in the seat 36. Since the head of the operator is forward of the horizontal member 48, the operator is protected should the tractor tip over rearwardly. The broken line in FIG. 1, identified by the letter G represents the ground line when the tractor has tipped over rearwardly, while the broken line identified by the letter G' identifies the ground line when the tractor is lying on its top. Since the front member 26 is of reinforced construction, it will support the weight of the tractor when it is lying on its top. As is apparent from FIG. 1, an operator strapped to the tractor seat 36 by a seat belt is suspended clear of the ground when the tractor is lying either on its back or on its top. The projection of the horizontal member 48 laterally beyond the upright members 44 and 46 provides an extra margin of safety for the operator during a lateral tipping of the tractor, as shown in FIG. 3, wherein the broken line identified by the letter G'' indicates the ground when the tractor is lying on its side.

A relatively flat, horizontal canopy structure, indicated in its entirety by the numeral 60, is rigidly attached to the horizontal member 48 in a cantilevered fashion and overlies the operator's station, the canopy 60 including right and left fore-and-aft frame members 62 and 64 respectively having their rearward ends rigidly attached to the opposite ends of the horizontal member 48 and their forward ends attached to and connected by a transverse front frame member 66, the frame members 62, 64 and 66 in conjunction with the horizontal member 48 forming a rectangular horizontal frame. A relatively flat, horizontal roof 68, preferably made of fiber glass or similar material, is mounted on and substantially coextensive with the canopy frame and is formed with fore-and-aft extending gutters 70 along its opposite sides. As best seen in FIG. 1, a pair of fenders 72 can be attached to the right and left upright members 44 and 46 respectively between the tractor seat 36 and the right and left traction wheels 20 and 22.

In operation, the roll bar structure 42 only may be provided as an optional attachment to the tractor, the roll bar structure being easily attachable and removable from the tractor by means of the clamping device 52. As previously described, the roll bar structure will protect the operator in the event of a tractor upset, provided, of course, the operator is utilizing a seat belt and remains in the tractor seat. The configuration of the roll bar structure is such that it will not interfere with most equipment mounted on the tractor, although, if it should interfere wtih equipment such as a tractor-mounted corn picker, it is easily removable. The canopy 60 can be provided as an optional attachment for the roll bar structure and can be rigidly attached thereto. The canopy provides substantial protection for the operator from rain or the sun and provides an incentive for the operator to utilize the protection afforded by the roll bar structure since the canopy can only be attached to the roll bar structure.

We claim:

1. In a tractor having a main tractor frame including a rearward transmission housing and a pair of rear axle housings extending transversely from opposite sides of the rearward transmission housing and having outer portions with generally rectangular cross sections and horizontal top and bottom surfaces, a pair of rear wheels disposed at the outer ends of the axle housings, and an operator's station including a seat mounted on the frame above the rearward transmission housing, the improvement comprising: a pair of parallel, generally upright, slightly rearwardly inclined, upwardly tapered box beam members disposed on opposite sides of the seat and having their upper ends disposed substantially above and slightly to the rear of the seat, the upper ends of the beam members having a substantially smaller cross section than the lower ends; means for rigidly attaching the respective lower ends of the beam members to the outer portions of the opposite axle housings, said beam members being attached to the tractor only through said attaching means; a transverse horizontal beam member rigidly attached to the upper ends of the upright beam members, said beam members forming a roll bar structure adapted to support the weight of the tractor in an inverted position; a pair of parallel, generally fore-and-aft canopy frame members having their rearward ends rigidly attached to the horizontal beam member respectively adjacent to the opposite ends of the horizontal beam member, the fore-and-aft canopy frame members extending forwardly from and being supported in cantilever fashion only by said roll bar structure; and a generally horizontal roof member supported on the canopy frame members and overlying the entire operator's station.

2. The invention defined in claim 1 and including a pair of fenders respectively attached to the upright beam members and including upright portions disposed between the operator's station and the respective wheels and fore-and-aft elongated generally horizontal portions overlying the respective wheels.

3. The invention defined in claim 1 wherein the means attaching the upright beam members to the axle housing include a relatively flat top plate secured to the bottom of each upright beam member and engageable with the top surface of the respective axle housing, a relatively flat bottom plate disposed opposite each top plate and engageable with the bottom surface of the respective axle housings, and means operative between the respective top and bottom plates to draw the plates toward one another and thereby clamp the roll bar structure to the axle housings.

4. The invention defined in claim 1 wherein the horizontal beam member has its opposite ends disposed outwardly of the upper ends of the upright beam members and the fore-and-aft canopy frame members respectively extend forwardly from the opposite ends of the horizontal beam member outwardly of the upright beam members.

References Cited

UNITED STATES PATENTS

| 2,785,002 | 3/1957 | Schumaker | 280—150 |
| 2,828,970 | 4/1958 | Ivey | 280—150 |

FOREIGN PATENTS 11,573   2/1956   Germany.

BENJAMIN HERSH, Primary Examiner

JOEL E. SIEGEL, Assistant Examiner